United States Patent
Cawley (10) Patent No.: US 10,956,112 B2
(45) Date of Patent: Mar. 23, 2021

(54) SYSTEM FOR CONTROLLING A DISPLAY DEVICE

(71) Applicant: DISPLAYLINK (UK) LIMITED, Cambridge (GB)

(72) Inventor: Robin Alexander Cawley, Newbury (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 15/524,980

(22) PCT Filed: Oct. 23, 2015

(86) PCT No.: PCT/GB2015/053189
§ 371 (c)(1),
(2) Date: May 5, 2017

(87) PCT Pub. No.: WO2016/071670
PCT Pub. Date: May 12, 2016

(65) Prior Publication Data
US 2018/0285051 A1    Oct. 4, 2018

(30) Foreign Application Priority Data
Nov. 6, 2014  (GB) ..................................... 1419763

(51) Int. Cl.
*G06F 3/14*    (2006.01)
*H04M 1/725*    (2006.01)
(Continued)

(52) U.S. Cl.
CPC .......... *G06F 3/1454* (2013.01); *G06F 1/3262* (2013.01); *G06F 3/017* (2013.01);
(Continued)

(58) Field of Classification Search
CPC .............. G06F 3/04886; G06F 3/0481; H04N 21/42208; H04N 21/4126; H04N 2005/4425; G08C 17/02
See application file for complete search history.

(56) References Cited

U.S. PATENT DOCUMENTS

2008/0115067 A1    5/2008  McLean et al.
2010/0261508 A1*  10/2010  Chang ................... G06F 3/1454
                                                                    455/566

(Continued)

FOREIGN PATENT DOCUMENTS

| EP | 1 990 707 A1 | 11/2008 |
| EP | 2 712 152 A1 | 3/2014 |
| EP | 2849053 A2 | 3/2015 |

OTHER PUBLICATIONS

International Search Report & Written Opinion for corresponding PCT Application No. PCT/GB2015/053189.

(Continued)

*Primary Examiner* — Kevin M Nguyen
(74) *Attorney, Agent, or Firm* — Haynes and Boone, LLP (57) ABSTRACT

A method for a touchscreen mobile device (35) to control a remote display device (31), where the touchscreen comprises a touch sensitive input layer and an internal display for displaying an image of the main screen of the mobile device (35) showing one or more applications that the mobile device (35) is executing. When the mobile device (35) is connected to the display device (31), the mobile device (35) enters a display mode in which the mobile device (35) transmits the image to the display device (31) for display on the display device (31) and does not displace the image on the internal display, but maintains the touch sensitive input layer operational to enable the mobile device (35) to be used as an input/output device with which a user can interact using the touch sensitive input layer, such as a (Continued)

keyboard (34), game controller or other input device, such as a trackpad to sense movement of one or more fingers of a user across the touch sensitive input layer for controlling a cursor.

21 Claims, 8 Drawing Sheets

(51) Int. Cl.
　　*H04W 4/80*　　　　(2018.01)
　　*G06F 3/01*　　　　(2006.01)
　　*G06F 1/3234*　　　(2019.01)
　　*G06F 3/0488*　　　(2013.01)
　　*G06F 21/62*　　　 (2013.01)
　　*G06F 21/60*　　　 (2013.01)
　　*G06F 21/84*　　　 (2013.01)
　　*H04L 12/58*　　　 (2006.01)
　　*H04W 76/14*　　　(2018.01)

(52) U.S. Cl.
　　CPC ........ *G06F 3/0488* (2013.01); *G06F 3/04886* (2013.01); *G06F 3/1423* (2013.01); *G06F 21/606* (2013.01); *G06F 21/6263* (2013.01); *G06F 21/84* (2013.01); *H04M 1/7253* (2013.01); *H04W 4/80* (2018.02); *G06F 3/04883* (2013.01); *G06F 2203/0383* (2013.01); *G09G 2354/00* (2013.01); *G09G 2358/00* (2013.01); *H04L 51/38* (2013.01); *H04W 76/14* (2018.02)

(56) References Cited

U.S. PATENT DOCUMENTS

| 2011/0296308 | A1  | 12/2011 | Yi |
|---|---|---|---|
| 2012/0038541 | A1* | 2/2012  | Song ..................... G06F 3/1423 345/1.1 |
| 2012/0050183 | A1  | 3/2012  | Lee |
| 2013/0016040 | A1  | 1/2013  | Ahn et al. |
| 2013/0033435 | A1  | 2/2013  | Raveendran et al. |
| 2013/0167246 | A1  | 6/2013  | Lee et al. |
| 2013/0225151 | A1* | 8/2013  | King ....................... H04W 4/21 455/419 |
| 2013/0321329 | A1  | 12/2013 | Tokutake |
| 2014/0223490 | A1  | 8/2014  | Pan et al. |
| 2014/0298252 | A1* | 10/2014 | Choi ..................... G06F 3/0488 715/788 |
| 2014/0340204 | A1* | 11/2014 | O'Shea ................. G08C 17/02 340/12.54 |
| 2014/0344767 | A1* | 11/2014 | Shimizu ................. G06F 3/017 715/863 |
| 2015/0015378 | A1* | 1/2015  | Aliakseyeu ............ G08C 17/00 340/12.5 |
| 2015/0046945 | A1* | 2/2015  | Zhang ............... H04M 1/72519 725/37 |
| 2015/0172777 | A1* | 6/2015  | Park ................... H04N 21/4126 725/43 |

OTHER PUBLICATIONS

UK Search Report dated May 7, 2015 for corresponding GB Application No. GB1419763.6.

* cited by examiner

SYSTEM FOR CONTROLLING A DISPLAY DEVICE

RELATED APPLICATIONS

The present application is a U.S. National Stage Application under 35 USC 371, claiming priority to PCT Serial No. PCT/GB2015/053189, filed on Oct. 23, 2015; which claims priority to Great Britain Patent Application Serial No. GB1419763.6, filed on Nov. 6, 2014, the entirety of all of which are incorporated herein by reference.

The invention relates to a method and apparatus for controlling a display device using a mobile device.

BACKGROUND

It is known that it is possible to connect a mobile device, such as a smartphone or tablet computer ("Mobile") to a larger, separate, display ("Display"), such as a television, projector, or monitor which is capable of showing image data provided by the Mobile. This often occurs because users wish to use their Mobiles as home computing devices. Since the internal screen of a Mobile is normally relatively small, a user often wishes to connect it to a larger Display. However, setting up and using the Display is often complex as it involves connecting the Mobile, turning on the Display and possibly configuring the Display so that the Mobile can control it. This is time-consuming, inconvenient and may be difficult for less technical users. Even if the Mobile and Display are already configured to connect to one another, it is still necessary to turn on the Display and activate the connection, which is inconvenient for the user.

The user may also wish to control the Display via a touch-sensitive input and display system ("Touchscreen"), especially for applications where navigation can be handled more intuitively by means of 'gestures' such as moving two fingers on a touchscreen in order to zoom in or out. This is usually not possible on a separate Display as most Displays do not have touchscreen capability. Additionally, especially in a home setting, a Display is unlikely to be close enough to the user for him or her to touch it. A Touchscreen of a mobile device generally consists of a touch sensitive input layer on top of a Display.

Once a Mobile is connected to a Display, the Display typically only mirrors the internal display of the Mobile. The user interacts with the Mobile in the conventional way appropriate to the Mobile and there is no other way to interact with the Mobile that takes account of the fact that the images are on the large Display in front of the user.

For example, most Mobiles are controlled via a Touchscreen and the user interacts with the Mobile by tapping or dragging a finger on the Touchscreen to interact with the Mobile, causing results that can then be mirrored on the Display. The Display does not show a mouse cursor or any other indication of where the interaction is occurring, so the user must look at the Mobile while interacting with it. When the user is attempting to perform an activity that requires a lot of interaction, such as browsing the Internet, he or she must either ignore the Display or continually look up and down between the Mobile and the Display. The former defeats the object of connecting to the Display and the latter is not only inconvenient but also uncomfortable and could have negative health implications for the user.

An example of a known system is the Windows 8.1 operating system, which includes wireless display capabilities, developed using the Wi-Fi Alliance (WFA) Miracast specification. This allows a user to wirelessly project his or her display onto a Display from a Mobile such as a Microsoft Surface tablet. However, the only available settings for interaction between the Mobile and the Display in this situation are "Duplicate", in which the Display mirrors the internal screen of the Mobile; "Extend", in which the Display provides an extended desktop for the Mobile; and "Second Screen Only", in which only the Display is used. These options do not take full advantage of the capabilities of the Mobile as it will either be used to display data—and the user will interact with it in the conventional way as mentioned above—or it will not be used at all except as a source of image data. When the Display provides an extended desktop for the Mobile, it is necessary for the Display to be a Touchscreen and the user interacts with the images on the Display as he or she would if they were still on the Touchscreen of the Mobile: through the Touchscreen of the Display. This requires an expensive Touchscreen Display and also for the Display to be within reach for the user.

The present invention seeks to make more efficient use of the capabilities of the Mobile so as to reduce the above-mentioned problems of the prior art.

OVERVIEW

According to a first aspect of the present invention, there is provided a method for a touchscreen mobile device to control a remote display device, the touchscreen comprising a touch sensitive input layer and an internal display for displaying an image of the main screen of the mobile device showing one or more applications that the mobile device is executing, the method comprising:

the mobile device detecting a connection between the mobile device and the display device; and when the mobile device is connected to the display device, the mobile device entering a display mode in which the mobile device transmits the image to the display device for display on the display device and does not display the image on the internal display, but maintains the touch sensitive input layer operational to enable the mobile device to be used as an input/output device.

Since the mobile device supplies the image to the display device, this allows a user to move the display from the mobile device onto a larger screen and means that the display device can be a relatively thin device rather than being a separate computer. This will mean that the display device can be relatively cheap and simple and it will also draw less power than if it had to have a separate processor. If there is a sufficiently reliable connection between the mobile device and the display device, the display device could even have no processing power or memory at all but only a means of showing the display data directly onto the screen.

The provision of a display mode means that the mobile device can be configured to function in a particular way when connected to a display device, differently to its behaviour in normal use. This is in contrast to the current art, for example, the Windows 8.1 and Miracast system described above, because in that system the mobile device continues to operate in a conventional way and there is no special mode.

For example, in a system according to the present invention the mobile device could use different methods of input or assign resources in the most efficient manner for connection to a display device. This method would take advantage of the fact that a user is likely to be using a mobile device differently if it is connected to a display device and will result in more user-friendly behaviour and more efficient assignment of resources. Thus, the particular input mode that the mobile device is configured to operate in will depend on the particular application that is being used by the user of the mobile device at the time. If the application is a passive one, where the user does not need to interact, then the mobile device may be relatively inert. However, if the application requires interaction, then the mobile device may operate to provide a keyboard, or a trackpad, or other input device depending on the requirements of the application, and may, of course, change the input mode during an application, as required.

Preferably, when the mobile device is in display mode, the internal display is blank or shows a placeholder such as an information screen with which a user cannot interact. This could be beneficial because it may reduce the power usage of the mobile device while the main display is on a remote display device and there is no need to use the internal display of the mobile device. It may also free the internal display of the mobile device for other uses.

In one embodiment, when the mobile device is in display mode, the internal display may display a keyboard, game controller or other input device, with which a user can interact using the touch sensitive input layer. This would mean that the mobile device can be used for an alternative form of input and the internal display can change its appearance without the mobile device having to exit the display mode.

Alternatively, when the mobile device is in display mode, the mobile device may be configured to enable the touch sensitive input layer to be used as a trackpad to sense movement of one or more fingers of a user across the touch sensitive input layer for controlling a cursor. This could be achieved by changing the behaviour of the touchscreen from an absolute mode to a relative mode such that it reacts to the user dragging a finger across the screen from one point to another by sensing the movement and the distance between the two points rather than the exact positions of the two points. Similarly, taps on the touchscreen are interpreted in a conventional way but without reference to the exact location on the touchscreen tapped by the user. A corresponding cursor could be shown on the display device. This would make it easier for a user to navigate on the display device and make it unnecessary for him or her to continually look down at the mobile device. It could also result in a more intuitive user interface as many users are already accustomed to using trackpads while looking at a screen in front of them. Additionally, because it is a touchscreen it can be used for interaction that would otherwise be impossible on the display device unless the user purchased a more expensive display device with touchscreen capabilities and sat close enough to touch it.

In an embodiment, when the mobile device is in display mode, the mobile device may be configured to control the display device via physical movements of the mobile device by a user. This is possible in display mode because in normal use it is likely that agitation of the mobile device would make it too difficult to view its screen. However, it could provide a straightforward way for the user to navigate and interact with a display device. It would be especially useful for users who have difficulty interacting with a small screen such as the internal display of a mobile device and who might therefore have difficulty with navigating via a trackpad. This extra functionality would make it possible to navigate via pre-programmed motions (for example, a twitch to the right to return to a home screen) or by pointing the mobile device at the screen to control a mouse cursor.

Preferably, the virtual keyboard can be displayed on substantially the whole of any internal display on the mobile device. In presently-known devices, when a user puts the focus on a text field in order to type in it, a virtual keyboard is displayed on the internal display of the mobile device. However, the keyboard usually occupies half of the display, partially obscuring the application into which the user is typing and only providing very small keys. By providing the display mode of the mobile device, substantially the whole internal display of the mobile device can be used while the application into which the user is typing is visible on the display device. This means it is easier for the user to see what he or she has typed (which is especially important for large text fields) and also means that the largest possible keyboard is available, which would be easier to use.

Advantageously, when the mobile device displays a virtual keyboard there may also be displayed a text box displaying one or more lines of input text. This would mean that the user can still look down at the mobile device as he or she types and will still be able to see what he or she is typing. However, because the text box may display only a single line, the keyboard will still occupy tire majority of the internal display of the mobile device and the user can look at the display device to check the full text of his or her input.

Preferably, when the mobile device is in display mode, and the display device is a touchscreen display device, the mobile device is controllable by user interaction with the display device. This would provide a more intuitive interface for the user in the case where he or she has connected a display device with touchscreen capabilities to the mobile device and is close enough to it to interact with it. A user is likely to be accustomed to interacting with such a display device by touch and will expect to be able to do so when the mobile device is connected to the display device and in display mode.

Preferably, the mobile device can be controlled by any other input method or combination of input methods that is not used in normal operation, such as buttons, temperature sensors, microphones, pressure sensors, tilt sensors, tap sensors that are independent from any internal touchscreen, or any other appropriate input method, including methods that may be incorporated into mobile devices in the future. This might enable use of input methods that may not be used in normal use, taking full advantage of the capabilities of those methods.

Preferably, when the mobile device is in display mode, the mobile device determines a type of image data being processed in the mobile device and includes or excludes the image data from the image according to the type of image data. In one embodiment, if the type of image data is private, the mobile device excludes the private image data from the image being sent to the display device and displays it on the internal display only. This would allow for limitations on what is shown on the display device, which would improve privacy and security for the user and, especially where the mobile device and display device are being used for presentations or sharing media, result in minimal disruption.

Preferably, when private image data is being displayed on the internal display, the mobile device is configured to allow user input on the mobile device as in a normal mode of operation. Private image data may include any one or more of:
  a dialog box for dialog between the mobile device and a user of the mobile device;
  a dialog box that blocks further processing until an answer has been received from a user of the mobile device;
  input from a user of the mobile device; and image data generated by an application running on the mobile device that has been designated as private.

A 'blocking' dialog box is an input screen that will not allow the user to continue until he or she has dealt with the screen. They are often used for inputting passwords and therefore it may not be desirable for them to appear on the display device where they would be visible to third parties. This behaviour could also apply regardless of the application that triggered the 'blocking' dialog box, which would mean that it would not be necessary for the user to configure the mobile device for every application, making use of the feature more convenient.

Preferably, the designation of whether an application is public or private may be stored, or, if the application is not previously designated, a default may be used, which may be, for example, that the application is designated public. In an embodiment, the mobile device is configured to allow a user of the mobile device to choose whether to display the private image data on the display device instead of the internal display. This would mean that a user could configure specific applications, for example an instant messaging application, to never send displays or notifications to the display device in the first instance. This would also improve privacy and would minimise disruption where the user was using the mobile device and display device to give any kind of presentation. However, it would be possible for the user to send the image data to the display device without changing the configuration of the application, for example where he or she wishes to send the video output of a Skype call to the display device but Skype is designated as a private application. The user might do this via a soft button appearing on the internal screen of the mobile device, a combination of one or more key or button presses, a voice command, a physical movement of the display device or any other appropriate method of inputting a command.

Other applications that could take advantage of this might include the telephone functionality of a smartphone: when the user receives a call, the 'receiving call' display might only appear on the telephone's internal screen, improving privacy for the user.

Preferably, the method may further comprise notifying a user of the mobile device that private image data is being displayed on the internal display. This might involve a visible, audible or tactile alert or any combination of these types of alerts. This would improve usability as it would mean that the user would be aware of the fact that there was a notification on the internal screen of the mobile device or that some input was required, even though he or she might only be looking at the display device. It may also prevent accidental inputs where, for example, there are soft buttons incorporated in a 'blocking' dialog box and if the user is unaware that the dialog box is displayed on the internal screen of the mobile device he or she might press one of these buttons by accident, leading to an undesirable result.

In any embodiment, where the mobile device is configured to be capable of making and receiving calls—for example: it may be a mobile telephone or other device that is capable of running applications, such as Skype, that allow calls to be made and received, for example over a Voice over Internet Protocol (VoIP) network—the mobile device can remain in display mode while receiving a call. The internal display should display the appropriate controls for the call—for example: 'pick up' and 'ignore' buttons which may or may not also be visible on the display device and the mobile device should function normally according to the implementation of the calling functionality without having to reconnect and change modes again when the call is complete. Furthermore, the method might include continuing to send the same image to the display device as the mobile device was sending before receiving the call, or mirroring the internal display of the mobile device, causing the display device to show a blank screen, or any other appropriate reaction to receiving a call, including varied reactions depending on the nature of the image currently being sent to the display device. This would allow a user to use a mobile device that is capable of making and receiving calls for this purpose with minimal interruption to use of the display device.

Furthermore, if the mobile device is capable of making and receiving calls as hereinbefore described, the mobile device may be configured to allow a user of the mobile device to make a call without the mobile device exiting the display mode. In this case, it should be possible to access the appropriate controls for example: a number pad and/or list of contacts and a 'call' button and the mobile device should function normally according to the implementation of the calling functionality without having to reconnect and change modes again when the call is complete. The mobile device might behave in the same way with respect to the display device as in the above method or there might be different behaviours for incoming and outgoing calls.

Preferably, the connection is wired or wireless. In one embodiment, the method further comprises:

the mobile device wirelessly detecting the display device; and the mobile device wirelessly connecting to the detected display device to provide the connection.

This would provide functionality that makes it more user-friendly to connect to and use a display device. At present, it may be necessary for a user to use multiple controllers to turn on the display device and connect the mobile device and the above method makes this unnecessary. This may be especially useful in a home environment where the display device is likely to only need to connect to one mobile device, but it could also be useful in an office setting where arm employee's mobile device could be configured to automatically connect to a display device at a hotdesk. This would mean that the display device would automatically connect and activate when the user sat down at the desk, which would save time and make logging in unnecessary.

Preferably, when the mobile device is connected to the display device, and remains idle i.e. not sending data to the display device—for a predetermined period of time the mobile device automatically disconnects from the display device. This would mean that if a user has finished using the mobile device to control the display device and forgets to disconnect it, the connection will end after a certain length of time. This will be more convenient for other users who may wish to connect to the same display device and will also save power on the mobile device and the display device as they will not need to maintain the connection unnecessarily.

Alternatively, there is a method whereby the Mobile can be manually connected to the Display. This may be wirelessly, via WiFi, Bluetooth or any other wireless connection that may occur to the reader, or by plugging in a wired connection such as USB, Ethernet or any other appropriate wired connection. The method may comprise after detecting the display device, the mobile device requesting approval from a user of the mobile device prior to wirelessly connecting to the display device; and the mobile device connecting to the display device upon receipt of approval from the user. It may require the user to command the mobile device to connect to the display device or the mobile device may suggest to the user that it should connect to the display device and ask the user to approve the connection. This is beneficial because it means that the mobile device will not connect to the display device when this is undesirable, such as when the user has only approached the display device for a brief time or for another purpose.

Furthermore, the method may further comprise: after detecting the display device, the mobile device checking whether the detected display device is authorised for connection; if the detected display device is not authorised for connection, the mobile device requesting approval from a user of the mobile device before wirelessly connecting to the display device; and the mobile device wirelessly connecting to the display device upon receipt of approval from the user.

According to a second aspect, there is provided a mobile device configured to perform a method as described above.

According to a third aspect, there is provided a system comprising:
- a mobile device as described above; and
- a display device configured to connect to the mobile device and to be controlled by the mobile device to display the image transmitted by the mobile device.

Preferably, the display device is configured to connect automatically to the mobile device and may, additionally be configured so that, when powered on, the display device has a specific mode in which it can connect automatically to the mobile device.

BRIEF DESCRIPTION OF THE DRAWINGS

Embodiments of the invention will now be more fully described, by way of example, with reference to the drawings, of which.

DETAILED DESCRIPTION OF THE DRAWINGS

Thus, FIG. 1(a) shows a Mobile [12], which may be a mobile telephone, such as a smartphone, or a tablet, or other mobile device having touchscreen capabilities, and a separate Display [11], which may be a stand-alone display device, such as a TV or monitor or other display device, in the situation before the Mobile [12] connects to the Display [11]. In this embodiment, the Display [11] is polling [13] for a Mobile to which it could connect, even though it begins in a powered-down state. In an alternative embodiment, the Mobile [12] could poll for a Display.

When the Mobile [12] detects the presence of the polling Display [11] it automatically attempts to connect. Alternatively, connections could be controlled by the user having to approve a new connection, by initial configuration, by the polling device being external to the Display [11] and unique to the Mobile [12] or by any other appropriate method. In this case, the Mobile [12] and Display [11] have previously been configured to recognise one another and the Mobile [12] is able to connect. As shown, the Display [11] is still blank, and the Mobile [12] displays an image [14] of a star on its internal display [17].

As shown in FIG. 1(b), after connection, the Display [11] has been powered on and has entered Connection Mode, in which it will accept data from the Mobile, which is in Display Mode. These changes in the mode of operation of both the Display [11] and the Mobile [12] occur automatically when the Mobile [12] and Display [11] form a connection [16].

In this embodiment the connection [16] is wireless. It could be implemented via Wi-Fi or any other suitable wireless method, or it could be wired using a plug, cradle or any other suitable wired method. Of course, if only wired connections are used, there would be no need for either device to poll in order to connect.

Upon connection, the Mobile [12] enters Display Mode. In this embodiment, the Display Mode requires that the image [14] that was on the Mobile's [12] internal display [17] is transferred to be shown on the Display [11] as image [15] (Shown here as fainter for clarity, but in practice would be at full image quality). The Mobile's [12] internal display [17], which is part of a touchscreen, is blanked and the touch sensitive input layer of the touchscreen functions as a trackpad. The user is therefore able to drag his or her finger across the touchscreen, as shown by the movement of circle [18] in order to move a cursor [19] on the Display [11].

Figure 2:
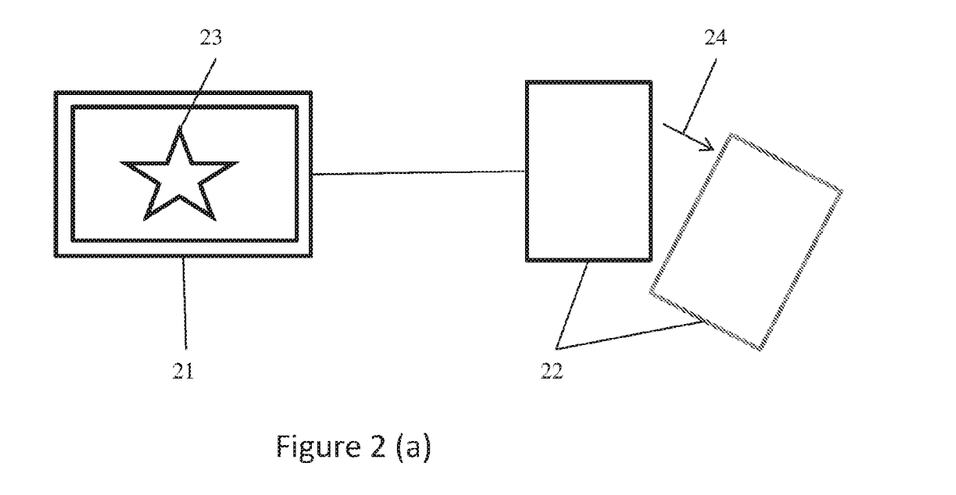
FIG. 2 shows the use of a physical gesture with the entire Mobile to navigate in Display Mode.

In FIG. 2, the Mobile [22] is shown as already connected to the Display [21]. In FIG. 2(a) the Display [21] shows the image [23] from an application running on the Mobile [22], but the Mobile's [22] internal display is blank. In this embodiment, the Mobile [22] is configured, when in Display Mode, to control the Display [21] via physical movements of the mobile [22] by a user. The user might flick the Mobile [22] to the right [24]. In this embodiment, the movement is detected by an accelerometer in the Mobile [22], but it could be detected in any other appropriate way, in this embodiment, the Mobile [22] has been previously programmed to treat such a right flick as the signal to change to a different application, but it will be appreciated that the Mobile may be programmed in any desired fashion, so that different movements or gestures may mean different commands. Indeed, the mapping may be changed, according to user preferences, and may be different for different users.

Thus, as shown in FIG. 2(b), the right flick [24] has caused the Mobile [22] to switch to running a different application and as a result the image [25] shown on the Display [21] has changed.

Figure 3:
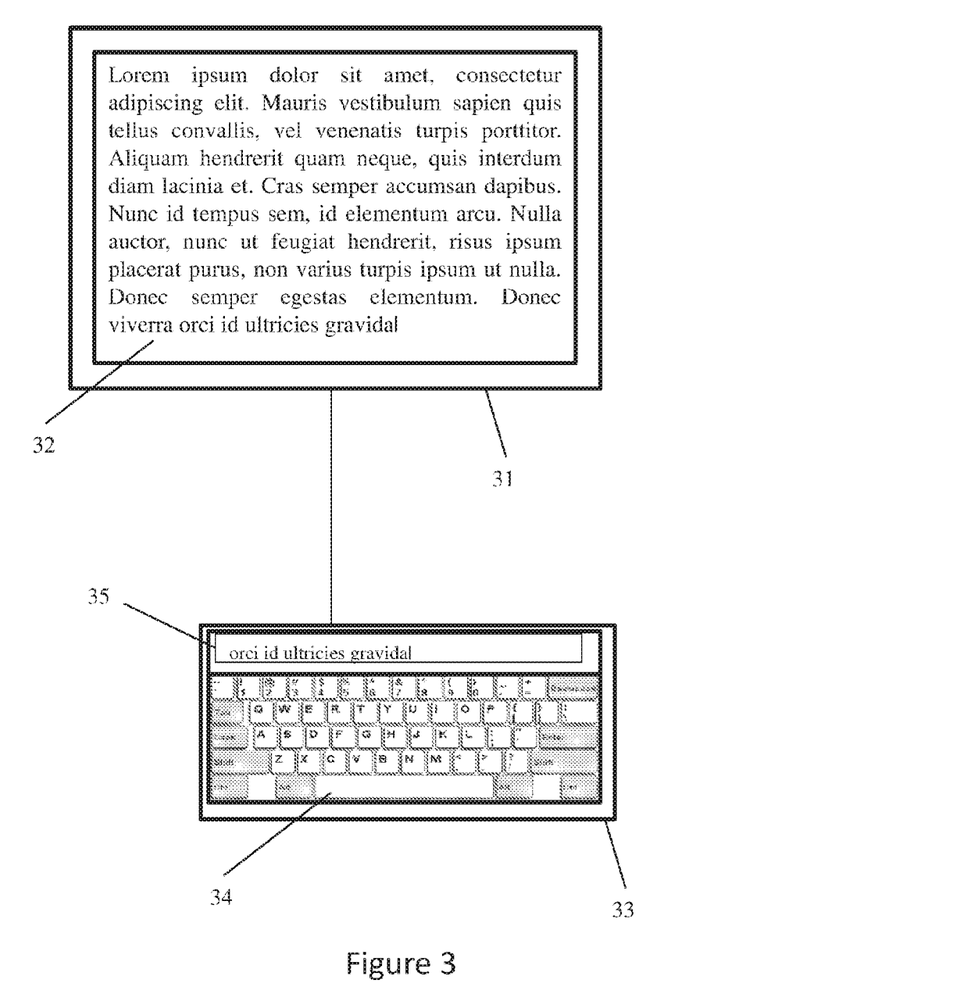
FIG. 3 shows the use of a Mobile connected to a Display as a keyboard when in Display Mode.

In FIG. 3, the Mobile [33] is connected to the Display [31] and is in Display Mode, with a word processing application or other application running in which the user edits text. The internal display of the Mobile [33], is mostly taken up by a virtual keyboard [34] hut, in this embodiment, there is also a 'mimic' text field [35] which shows the final line of the text and the cursor. The full body of text [32] is shown on the Display [31], but this arrangement means that the user is able to see what he or she is immediately typing without having to look up at the Display [31].

Figure 4:
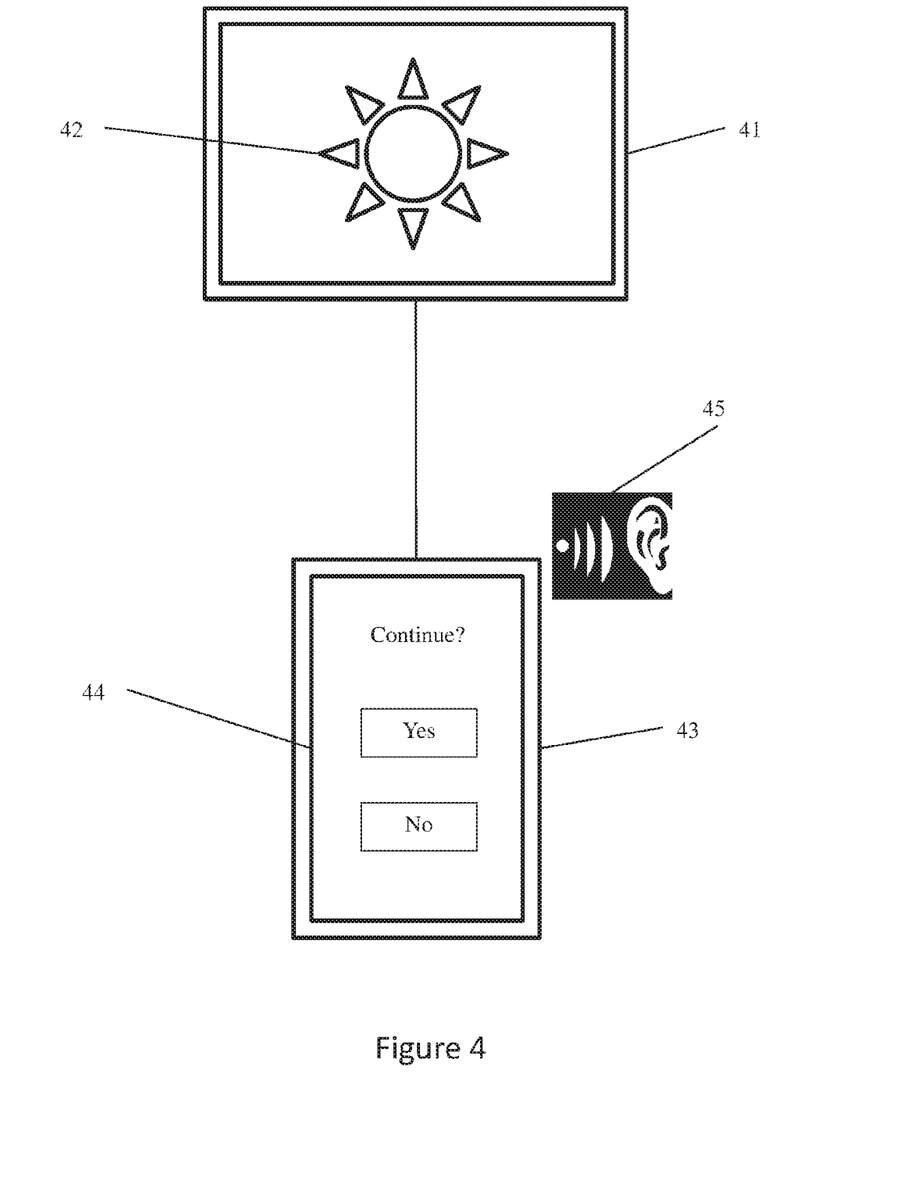
FIG. 4 shows the display of a blocking dialog box on the Mobile's internal screen when in Display Mode.

In FIG. 4, the Mobile [43], in Display Mode, is connected to the Display [41] and sends display data [42] to be shown on the screen of the Display [41]. The application that is generating the display data [42] then produces a blocking dialog box [44], in this example asking for confirmation that the user wishes to continue. The blocking dialog box [44] is only shown on the internal screen of the Mobile [43]. The user is then able to interact with the blocking dialog box [44]

on the internal screen of the Mobile [43] as though the Mobile [43] were not connected to the Display [41].

In the Display Mode, the Mobile [43] detects when an application generates such a blocking dialog box [44] and does not include it in the display data [42] to be displayed on Display [41]. More generally, the Mobile [41] can detect different types of data, of which a dialog box is merely one example, which are considered as private, so that they are excluded from the display data. Instead, they are displayed solely on the internal display of the Mobile [44]. Other types of data that may be considered to be private are other, non-blocking dialog boxes, input from a user of the mobile device, and image data generated by an application that has been designated as private. Applications running on the Mobile [43] may, for example, be predesignated as private or public, such that any data generated by a private application would be considered private. However, it is possible for the Mobile [43] to be configured to allow a user to choose whether to display such private data on the Display [41], perhaps by re-designating either the particular data, or the application, as public.

When the blocking dialog box [44] appears on the Mobile [43], it is likely that the user will be looking at the Display [41] and he or she may not notice that the internal display of the Mobile [43] has changed. Therefore, in this embodiment, the Mobile [43] plays a sound such as a beep [45] to alert the user to the fact that he or she needs to interact directly with the Mobile's internal display. It will be apparent that the use of a sound is an example only and other alerts could be provided, for example a vibration, light or other appropriate alert.

Figure 5A:
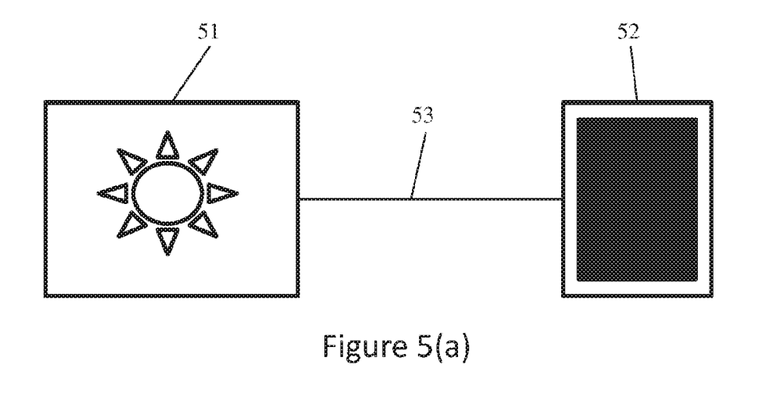
FIG. 5 shows the use of Connection Mode and automatic disconnection after a set period of time.
Figure 5B:
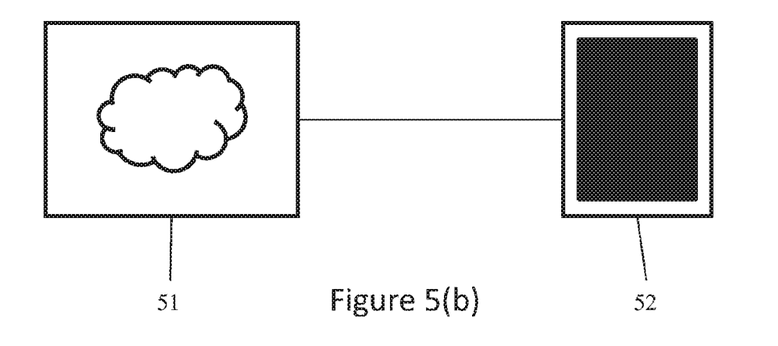
Figure 5C:
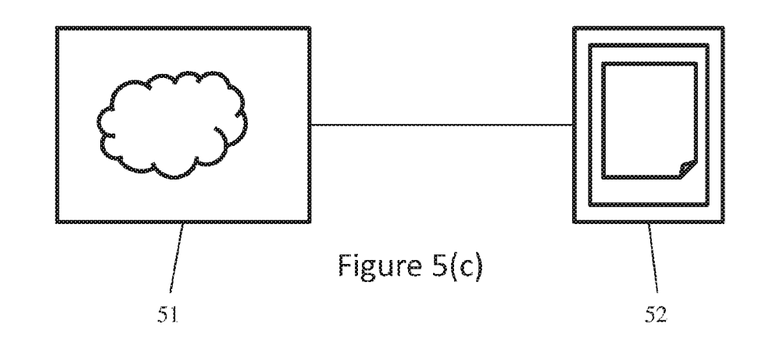

FIG. 5(a) shows a Mobile [52] in Display Mode connected by connection [53] to a Display [51] which is in Connection Mode and showing an image generated by an application on the Mobile [52]. The internal display of the Mobile [52], being in Display Mode with the image being transmitted to the Display [51] is blank, although the touch sensitive input layer of the touchscreen is operational. As shown in FIG. 5(b), when the user switches the Display [51] to another mode, for example to watch television, the Mobile [52] remains connected, but the Display [51] no longer accepts display data from the Mobile [52] and, instead, displays the TV images, so that the Mobile [52] is treated as being idle. Thus, as shown in FIG. 5(c), after the Mobile [52] has been idle for more than a certain period of time (for example, five minutes, but any period of time could be used and it could be chosen by the user or pre-programmed by a manufacturer or application programmer), it disconnects from the Display [51] and exits Display Mode, returning to normal mode. If the user wishes to use the Mobile [52] to control the Display [51] again, he or she must reconnect it in the appropriate way.

Figure 1:
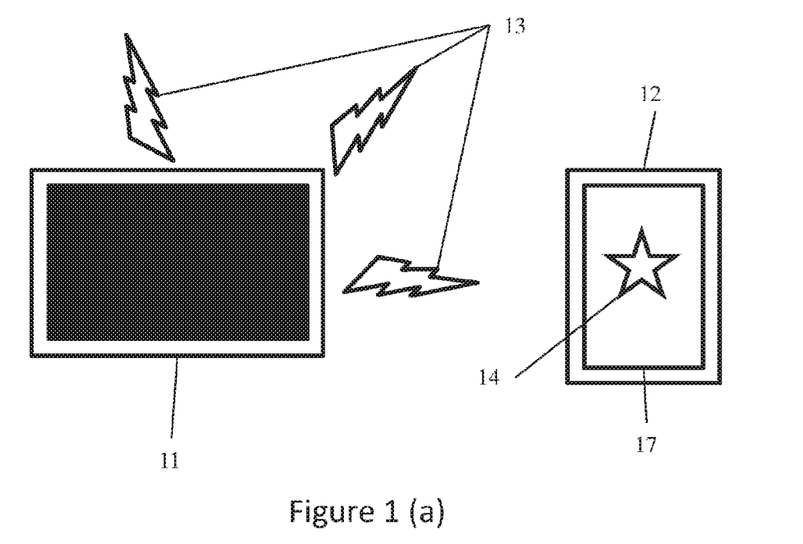
FIGS. 1(a) and 1(b) show stages of a Mobile automatically connecting to a Display and entering Display Mode.
Figure 6:
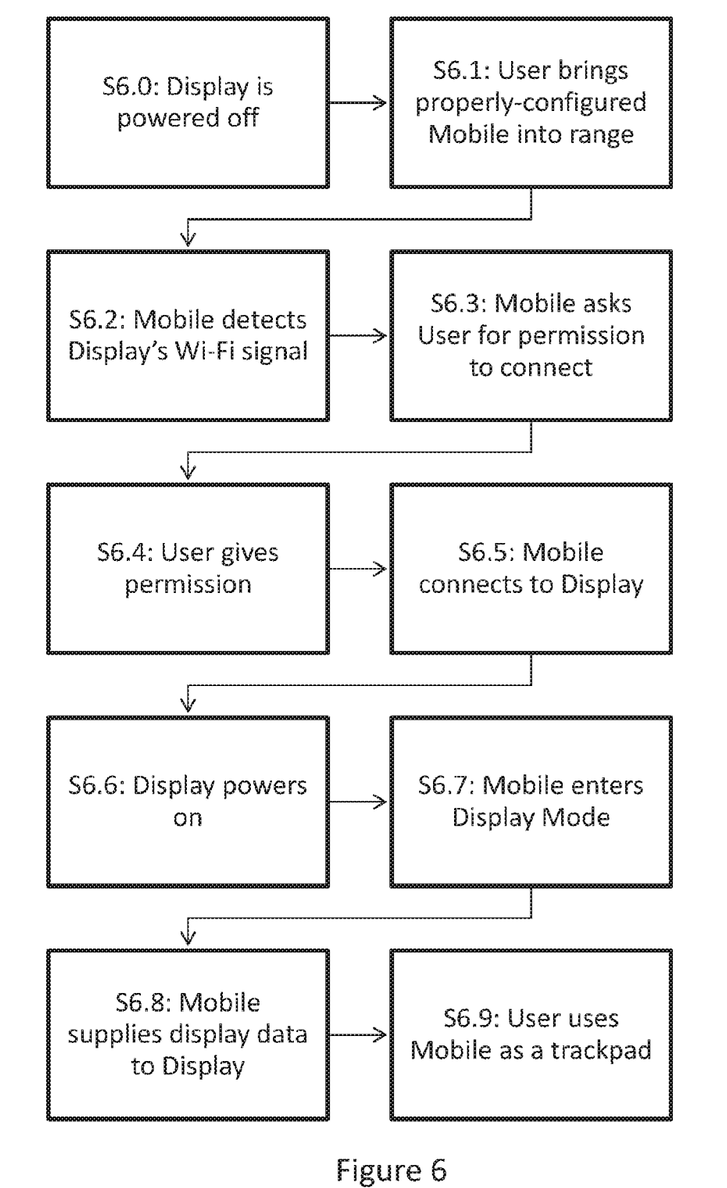
FIG. 6 shows a flowchart of the auto-connection process.

FIG. 6 shows the process of the automatic connection described in FIG. 1. As in FIG. 1(a), the Display is initially powered off (Step S6.0). The user then brings an appropriately-configured Mobile into range (Step S6.1). In this example, the Mobile has a Touchscreen as an internal display, but no other input methods. The Mobile detects the presence of the Display by its wireless signal, which in this example is over Wi-Fi (Step S6.2). The Mobile then asks for the user's permission to connect to the Display (Step S6.3) as a completely automatic connection may not be desirable. This could be done by displaying a message on the Mobile's internal screen and providing an 'Accept' button that the user then presses to allow the connection (Step S6.4). The Mobile then connects to the Display (Step S6.5). During the handshaking procedure required for the connection, the Display informs the Mobile of the fact that it is currently powered off, as well as its display and possibly audio capabilities. The Mobile also ascertains the capabilities of the connection.

As soon as the connection is complete, the Mobile sends a command to the Display, causing it to power on (Step S6.6). At the same time, the Mobile enters Display Mode (Step S6.7). In this mode, the behaviour of the Mobile's internal Touchscreen changes from absolute mode to relative mode and it begins sending display data to the Display rather than using its internal Touchscreen to display images (Step S6.8). The change of mode from absolute mode to relative mode means that the user is able to use the Touchscreen of the Mobile as a trackpad to control a cursor shown on the Display (Step S6.9).

FIG. 7 is a decision tree showing the process of displaying an image generated by a private application. The same process applies to a blocking dialog box except that a blocking dialog box cannot be moved onto the Display; it must always be displayed on the internal screen of the Mobile. This means that Steps S7.2.6-S7.2.8 are not available for a blocking dialog box. All other parts of the process are the same.

Figure 7A:
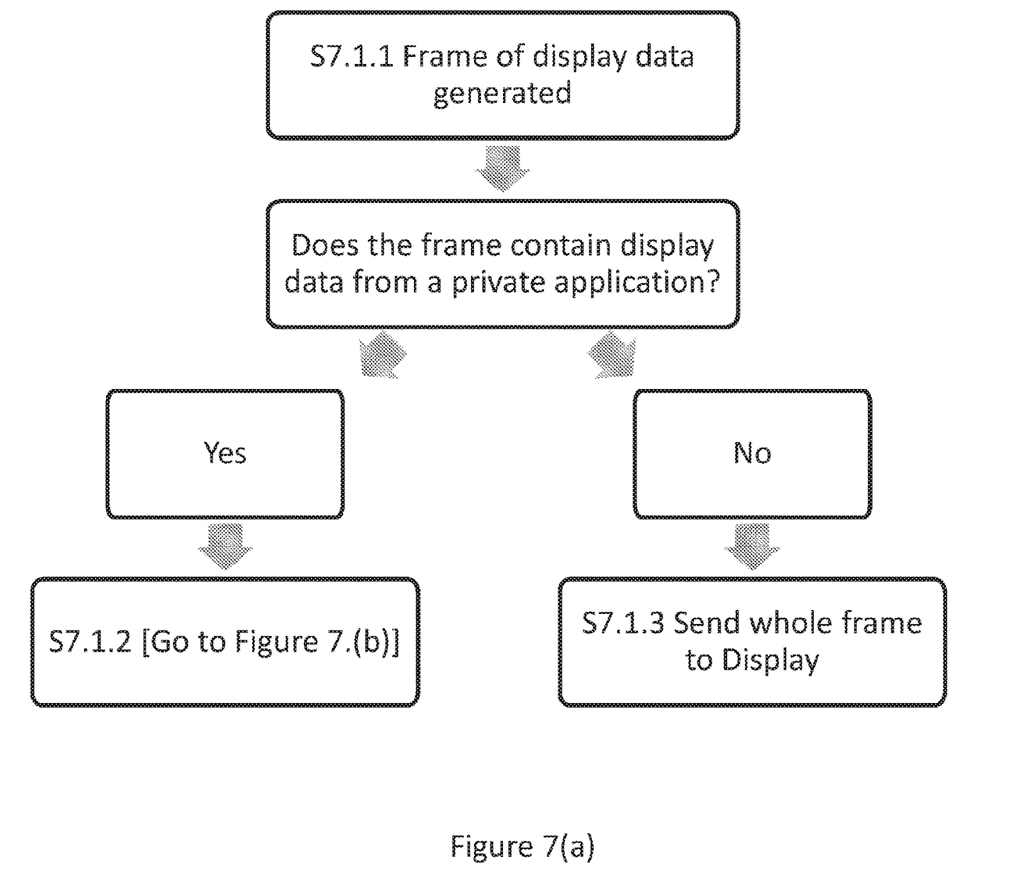
FIGS. 7(a) and 7(b) show a flowchart of the decision-making process with regard to blocking dialog boxes.

The Mobile is connected to a Display and in Display Mode. This means that it is sending display data to the Display, so it generates a frame of display data (Step S7.1.1) and prepares to send it. While composing the frame, it is aware of the source of each part of the display data and whether it comes from an application that has been designated as private. If so, it follows the left branch to Step S7.1.2 and follows the steps shown in FIG. 7(b). If the display data was not generated by a private application, as is the normal case, it will be displayed as normal (S7.1.3).

Figure 7B:
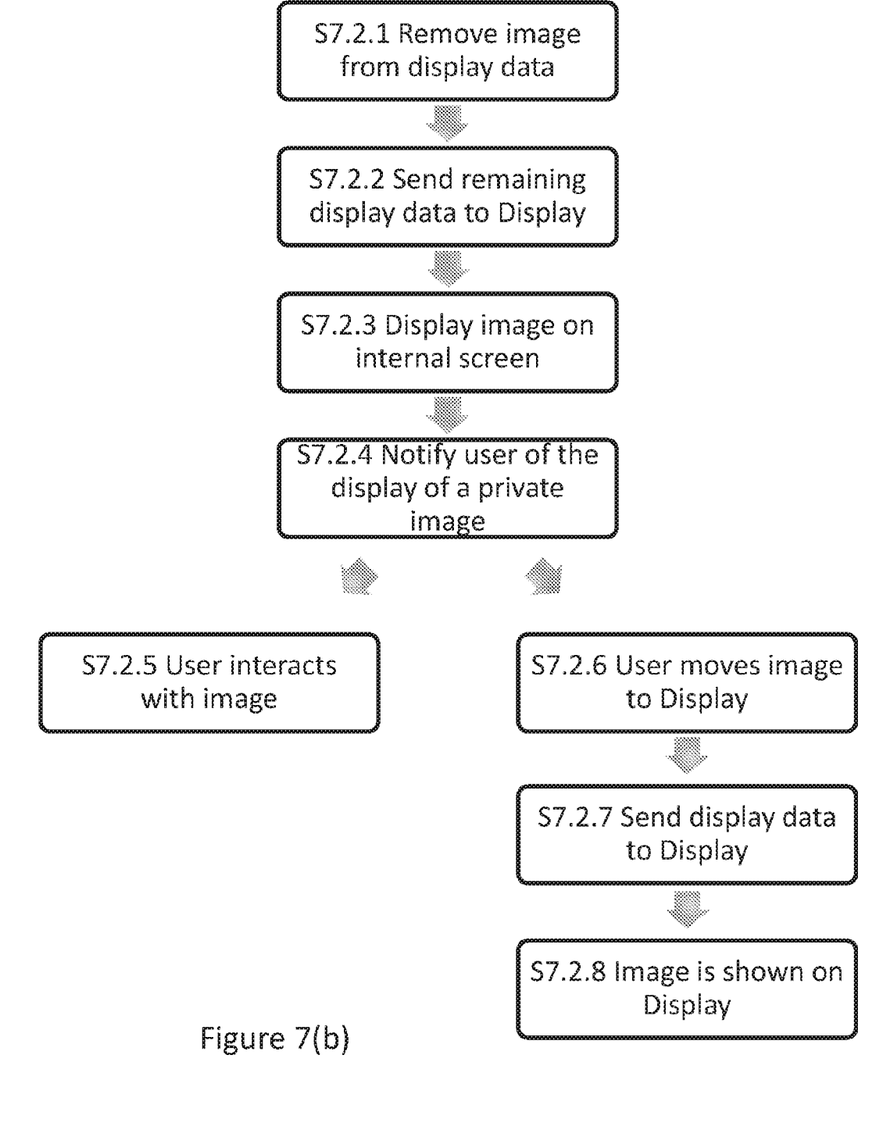

If the display data does include an image generated by a private application, this display data is removed from the frame (Step S7.2.1). If the output of the private application did not comprise the whole of the display data, the output of other applications is sent to the Display and displayed as normal (Step S7.2.2). The image from the private application is displayed on the Mobile's internal screen (Step S7.2.3). As the image is displayed, the Mobile notifies the user of the fact that the output of a private display is being shown on the internal screen (Step S7.2.4). It may do this by playing a sound, vibrating or showing a small notification on the Display, for example. The user is then able to interact with the image on the Mobile's internal screen.

The user may choose to only interact with the image on the internal screen, for example by pressing any soft buttons (Step S7.2.5). In this case, the image is never sent to the Display.

Alternately, the user may choose to display the image on the Display despite the fact that it is the output of a private application. He or she may press a button to send the image to the Display, drag it towards the Display or otherwise move it to the Display (Step S7.2.6). The Mobile then transmits the display data to the Display as usual (Step S7.2.7) and the image is shown on the Display (Step S7.2.8). The user is able to interact with it as with any other image.

Although several embodiments have been described in detail above, it will be appreciated that various changes, modifications and improvements can be made by a person skilled in the art without departing from the scope of the present invention as defined in the claims.

I claim:

1. A method for a touchscreen mobile device to control a remote display device, the touchscreen comprising a touch sensitive input layer and an internal display for displaying an image frame of display data of a main screen of the mobile device showing one or more applications that the mobile device is executing, the method comprising, at the mobile device:

generating an image frame of display data;

detecting a connection between the mobile device and the remote display device; and when the mobile device is connected to the remote display device, entering a display mode in which the mobile device transmits the image frame of display data to the remote display device for display on the remote display device and does not display the image frame of display data on the internal display, but maintains the touch sensitive input layer operational to enable the mobile device to be used as an input/output device, wherein, when in the display mode, the mobile device is configured to control the remote display device via physical movements of the mobile device by a user, wherein the physical movements are detected by an accelerometer in the mobile device, and wherein updated image frames are transmitted to the remote display device for display on the remote display device, the updated image frames being updated according to the physical movements of the mobile device.

2. A method according to claim 1, wherein, when the mobile device is in display mode, the internal display is blank or shows a placeholder such as an information screen with which a user cannot interact.

3. A method according to claim 1, wherein, when the mobile device is in display mode, the internal display displays a keyboard, game controller or other input device, with which a user can interact using the touch sensitive input layer.

4. A method according to claim 3, wherein, when the mobile device displays the keyboard on the internal display, it also displays a text box displaying one or more lines of input text.

5. A method according to claim 1, wherein, when the mobile device is in display mode, the mobile device is configured to enable the touch sensitive input layer to be used as a trackpad to sense movement of one or more fingers of a user across the touch sensitive input layer for controlling a cursor.

6. A method according to claim 1, wherein, when the mobile device is in display mode, and the remote display device is a touchscreen display device, the mobile device is controllable by user interaction with the display device.

7. A method according to claim 1, further comprising:
the mobile device wirelessly detecting the remote display device; and
the mobile device wirelessly connecting to the detected remote display device to provide the connection.

8. A method according to claim 7, further comprising:
after detecting the remote display device, the mobile device requesting approval from a user of the mobile device prior to wirelessly connect to the remote display device; and
the mobile device wirelessly connecting to the remote display device upon receipt of approval from the user.

9. A method according to claim 7, further comprising:
after detecting the remote display device, the mobile device checking whether the detected remote display device is authorized for connection;
if the detected remote display device is not authorized for connection, the mobile device requesting approval from a user of the mobile device before wirelessly connecting to the detected remote display device; and
the mobile device wirelessly connecting to the display device upon receipt of approval from the user.

10. A method according to claim 1, wherein, when the mobile device is in display mode, the mobile device determines a type of image data being processed in the mobile device and includes or excludes the image data from the image according to the type of image data.

11. A method according to claim 10, wherein, if the type of image data is private, the mobile device excludes the private image data from the image being sent to the remote display device and displays it on the internal display only.

12. A method according to claim 11, wherein, when private image data is being displayed on the internal display, the mobile device is configured to allow user input on the mobile device as in a normal mode of operation.

13. A method according to claim 11, wherein private image data includes any one or more of:
a dialog box for dialog between the mobile device and a user of the mobile device;
a dialog box that blocks further processing until an answer has been received from a user of the mobile device;
input from a user of the mobile device; and
image data generated by an application that has been designated as private.

14. A method according to claim 11, wherein the mobile device is configured to allow a user of the mobile device to choose whether to display the private image data on the remote display device instead of the internal display.

15. A method according to claim 14, wherein private image data originating from an application designated as private is displayed on the remote display device without alteration to the configuration of the application.

16. A method according to claim 11, further comprising notifying a user of the mobile device that private image data is being displayed on the internal display.

17. A method according to claim 1, wherein the mobile device is configured to allow a user of the mobile device to make a call without the mobile device exiting the display mode.

18. A mobile device configured to perform a method according to claim 1.

19. A system comprising:
a mobile device according to claim 18; and
a remote display device configured to connect to the mobile device and to be controlled by the mobile device to display the image frame of display data transmitted by the mobile device.

20. A system according to claim 19, wherein the remote display device is configured to connect automatically to the mobile device.

21. A system according to claim 20, wherein the remote display device is configured so that, when powered on, the remote display device has a specific mode in which it can connect automatically to the mobile device.

* * * * *